United States Patent
Kong et al.

(10) Patent No.: US 9,543,819 B2
(45) Date of Patent: Jan. 10, 2017

(54) ADAPTIVE BJT DRIVER FOR SWITCHING POWER CONVERTER

(71) Applicant: Dialog Semiconductor Inc., Campbell, CA (US)

(72) Inventors: Pengju Kong, Campbell, CA (US); Hien Bui, Campbell, CA (US); Duc Doan, Campbell, CA (US); John Shi, Campbell, CA (US); Judy Sha, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 97 days.

(21) Appl. No.: 14/584,676

(22) Filed: Dec. 29, 2014

(65) Prior Publication Data
US 2016/0164397 A1  Jun. 9, 2016

Related U.S. Application Data

(60) Provisional application No. 62/089,149, filed on Dec. 8, 2014.

(51) Int. Cl.
  *H02M 1/08* (2006.01)
  *H02M 3/335* (2006.01)
  *H02M 1/00* (2006.01)

(52) U.S. Cl.
  CPC ........... *H02M 1/08* (2013.01); *H02M 3/33523* (2013.01); *H02M 2001/0054* (2013.01)

(58) Field of Classification Search
  CPC ............... H02M 3/33507; H02M 2001/0054; H02M 1/08; H02M 2001/0009; H02M 2001/0032; H02M 3/33523; H03K 17/04213
  See application file for complete search history.

(56) References Cited

U.S. PATENT DOCUMENTS

| | | | |
|---|---|---|---|
| 2003/0169023 A1* | 9/2003 | Croce ................ | H03K 17/0814 323/249 |
| 2009/0040796 A1* | 2/2009 | Lalithambika .... | H02M 3/33507 363/21.17 |
| 2010/0157636 A1* | 6/2010 | Li ..................... | H02M 3/33515 363/124 |
| 2010/0202165 A1* | 8/2010 | Zheng ............... | H02M 3/33507 363/21.13 |

\* cited by examiner

*Primary Examiner* — Adolf Berhane
*Assistant Examiner* — Henry Lee, III
(74) *Attorney, Agent, or Firm* — Haynes and Boone, LLP

(57) ABSTRACT

A flyback converter is provided that includes a base driver for driving a base current into a base of a BJT power switch. The base driver is controlled so as to adaptively vary the base current across at least some of the pulses.

20 Claims, 4 Drawing Sheets

ADAPTIVE BJT DRIVER FOR SWITCHING POWER CONVERTER

RELATED APPLICATIONS

This application claims the benefit of U.S. Provisional Application No. 62/089,149, filed Dec. 8, 2014, the contents of which are incorporated herein in their entirety.

TECHNICAL FIELD

This application relates to switching power converters, and more particularly to a switching power converter configured to control the rate of change for a base current for a bipolar junction transistor (BJT) power switch to be proportional to a rate of change for the BJT power switch's collector current.

BACKGROUND

The explosive growth in mobile electronic devices such as smartphones and tablets creates an increasing need in the art for compact and efficient switching power converters so that users may recharge these devices. A flyback switching power converter is typically provided with a mobile device as its transformer provides safe isolation from AC household current. This isolation introduces a problem in that the power switching occurs at the primary side of the transformer but the load is on the secondary side. The power switching modulation for a flyback converter requires knowledge of the output voltage on the secondary side of the transformer. Such feedback can be obtained through opto-isolators bridging from the secondary side to the primary side but this adds to cost and control complexity. Thus, primary-only feedback techniques have been developed that use the reflected voltage on the primary side of the transformer in each switching cycle.

In a switching cycle for a flyback converter, the secondary current (the current in the secondary winding of the transformer) pulses high after the primary-side power switch is cycled off. The secondary current then ramps down to zero as power is delivered to the load. The delay between the power switch off time and the secondary current ramping to zero is denoted as the transformer reset time (Trst). The reflected voltage on the primary winding at the transformer reset time is proportional to the output voltage because there is no diode drop voltage on the secondary side as the secondary current has ceased flowing. The reflected voltage at the transformer reset time is thus directly proportional to the output voltage based upon the turn ratio in the transformer and other factors. Primary-only feedback techniques use this reflected voltage to efficiently modulate the power switching and thus modulate the output voltage.

The power switch in a flyback converter may comprise a transistor such as a MOSFET or a bipolar junction transistor (BJT). As compared to MOSFETs, BJTs are cheaper to manufacture. In addition, BJTs have less EMI noise and lessen the need for snubber circuitry. Thus, the use of BJT power switches in flyback converters has grown in popularity, particularly for low-power applications such as for the growing mobile device market. A particularly advantageous flyback converter having a BJT power switch is disclosed in commonly-assigned U.S. Pat. No. 8,289,732 (the '732 patent), the contents of which are incorporated by reference in their entirety. In this flyback converter architecture, the BJT collector current (and thus the primary current) is controlled on a pulse-by-pulse basis using primary-only feedback. A feedback sense voltage ($V_{sense}$) is sensed on the primary side (such as on an auxiliary winding) at the transformer reset time as discussed above. A controller for the flyback converter compares the feedback voltage $V_{sense}$ to a reference voltage that represents the target voltage at the output (as scaled according to the turn ratio in the transformer) to generate an error signal. The controller processes the error signal to control the power switch accordingly so that the desired peak primary current is achieved in the next switching cycle. Each time the BJT power switch is switched on, the collector current linearly ramps from zero to the desired peak current for that pulse.

Although the resulting control architecture is remarkably low cost and efficient, the linear variation in the collector current for each current pulse complicates the formation of the appropriate base current. To function as a switch, the base current for the BJT power switch should be sufficiently greater than the ratio of its collector current and common emitter gain so that the BJT power switch is driven into saturation. The appropriate amount of base current thus varies according to the linear variation of the collector current. Driving this sufficient amount of base current to maintain the BJT power switch in saturation is thus not an easy task as a sufficient amount of overdrive is necessary for the peak primary/collector current that is achieved just prior to switching off the BJT power switch. One approach for ensuring that this peak collector current is achieved involves driving the base current according to the overdrive amount sufficient to achieve this peak collector current across the entire pulse. But this use of such a constant base current then wastes power due to the resulting excessive overdrive across the bulk of the pulse but for the peak collector current. An example of such constant base current driving is shown in FIG. 1. A base driver on signal pulses on and off to control a generation of constant base current (iB) pulses accordingly. During each base current pulse, the collector current (iC) ramps up from zero to a peak collector current value. This amount of base current is sufficient for overdrive at this peak collector current and is thus excessive during the remainder of each pulse.

Accordingly, there is a need in the art for improved base current driving techniques and systems for switching power converters having BJT power switches.

SUMMARY

A switching power converter is provided that includes a controller that adaptively adjusts the base current for a BJT power switch across each pulse. In this fashion, power is saved as compared to the conventional use of a constant base current in each pulse. In addition, thermal stress on the corresponding current driver is reduced. These advantageous features may be better appreciated from the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for more efficient control of the base current for a BJT power switch in a switching power converter, a controller is provided that adaptively adjusts the base current driven into the BJT power switch to vary the base current during the on-time of each primary current pulse. In flyback converter embodiments using primary-only feedback, the controller determines the desired primary current on a pulse-by-pulse basis. These features may be better understood with regard to the following example embodiments.

Figure 2:
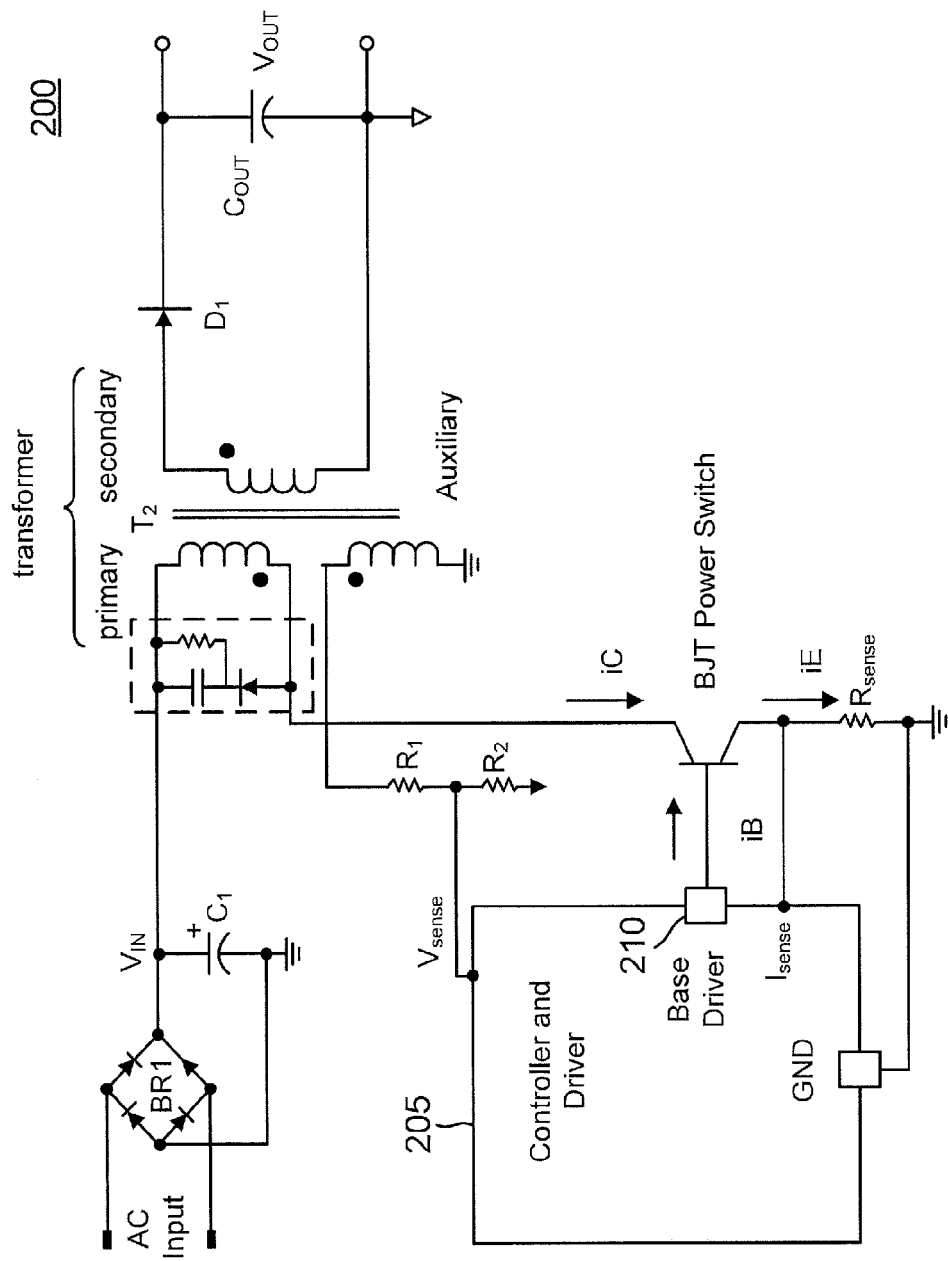
FIG. 2 is a circuit diagram of a flyback converter including a converter configured in accordance with an embodiment of the disclosure.

An example flyback converter 200 is shown in FIG. 2. The AC input is rectified through a bridge rectifier BR1 and input capacitor $C_1$ to form an input voltage $Y_{IN}$. A controller 205 controls a BJT power switch coupled to a primary (1°) transformer winding to control whether a pulse of primary current may build stored magnetic energy in the corresponding transformer. To do so, controller 205 drives a base current (iB) into the base of the BJT power switch to switch on the BJT power switch so that a collector current (iC) may develop. This collector current is also the primary winding current since the primary winding couples between the bridge rectifier and the collector of the BJT power switch. The resulting emitter current from the BJT power switch equals the sum of the base and collector currents.

As discussed in the '732 patent, controller 205 may control the peak amount of collector current in each current pulse (and thus also control the peak primary winding current) responsive to a $V_{sense}$ feedback voltage derived from a reflected voltage on an auxiliary winding. This reflected voltage occurs when controller 205 switches off the BJT power switch in each pulse cycle, whereupon a diode $D_1$ on the secondary side of the transformer becomes forward biased such that the stored magnetic energy in the transformer is delivered to a load. This delivery of energy maintains an output voltage ($V_{OUT}$) across the load as filtered by a load capacitor $C_{OUT}$. This delivery of energy to the load produces a reflected voltage on the primary-side auxiliary winding as a function of the voltage drop across the diode $D_1$ and the output voltage $V_{OUT}$. As the stored magnetic energy in the transformer is depleted, the secondary winding current will drop to zero at a transformer reset time such that there is no voltage drop across diode $D_1$. This time represents the ideal time to sample the reflected voltage to obtain an accurate estimate of the output voltage $V_{OUT}$. The auxiliary winding couples to a voltage divider such as implemented through resistors R1 and R2 to produce the $V_{sense}$ feedback voltage that is sampled by controller 205 at the transformer reset time to monitor the output voltage $V_{OUT}$.

The feedback voltage $V_{sense}$ is just one parameter used in primary-only feedback embodiments as implemented by controller 205. In addition, the primary winding current may be sampled through a sense resistor $R_{sense}$ to produce an $I_{sense}$ voltage that represents the primary winding current. In flyback converter 200, the sense resistor $R_{sense}$ is sampling the emitter current so controller 105 may determine the peak collector current (and hence the primary current) by subtracting the peak base current from the peak emitter current. As discussed in the '732 patent, controller 205 may use the rate of change of the collector current as determined through the $I_{sense}$ voltage to indirectly measure the input voltage $V_{IN}$. This is quite advantageous as controller 205 may then determine the input voltage without requiring an additional input pin. As further discussed in the '732 patent, controller 205 may process the feedback signals $V_{sense}$ and $I_{sense}$ on a pulse-by-pulse basis to determine the desired peak collector current for subsequent pulses.

To generate the base current iB, controller 205 may include a base current driver 210 that controller 205 controls so that the BJT power switch is driven into saturation across the entire current pulse so that the BJT functions as a power switch. Referring again to FIG. 1, the collector current ramps from zero to a peak value in each pulse. This peak collector current value corresponds to a minimum amount of base current to ensure saturation at that time, which requires the base current at the time of peak collector current generation to be greater than the ratio of the peak collector current and the common emitter gain β. The saturated BJT power switch then functions according to a "forced" common emitter gain that is less than the actual common emitter gain. There is thus a peak base current required to maintain saturation for the BJT power switch when it is conducting the peak collector current ($I_{peak}$). This peak base current value is greater than the ratio ($I_{peak}/\beta$). As discussed previously with regard to FIG. 1, it is conventional to drive the base current at this peak level (or higher) across the entire pulse. But this wastes power and increases the thermal stress on the current driver in the controller.

Figure 1:
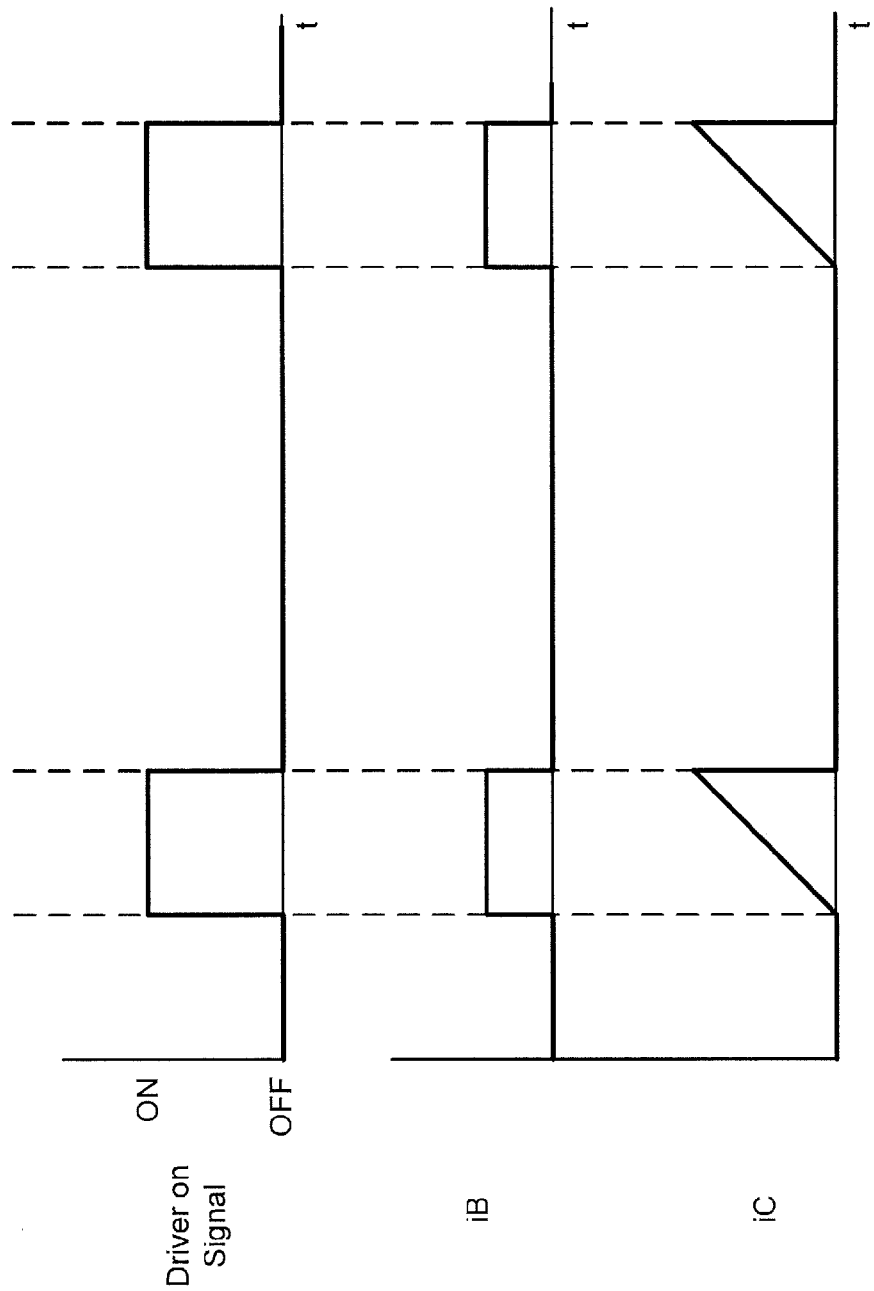
FIG. 1 illustrates the waveforms for the driver signal, base current, and collector current for a series of pulses according to a conventional base current driving scheme.
Figure 3:
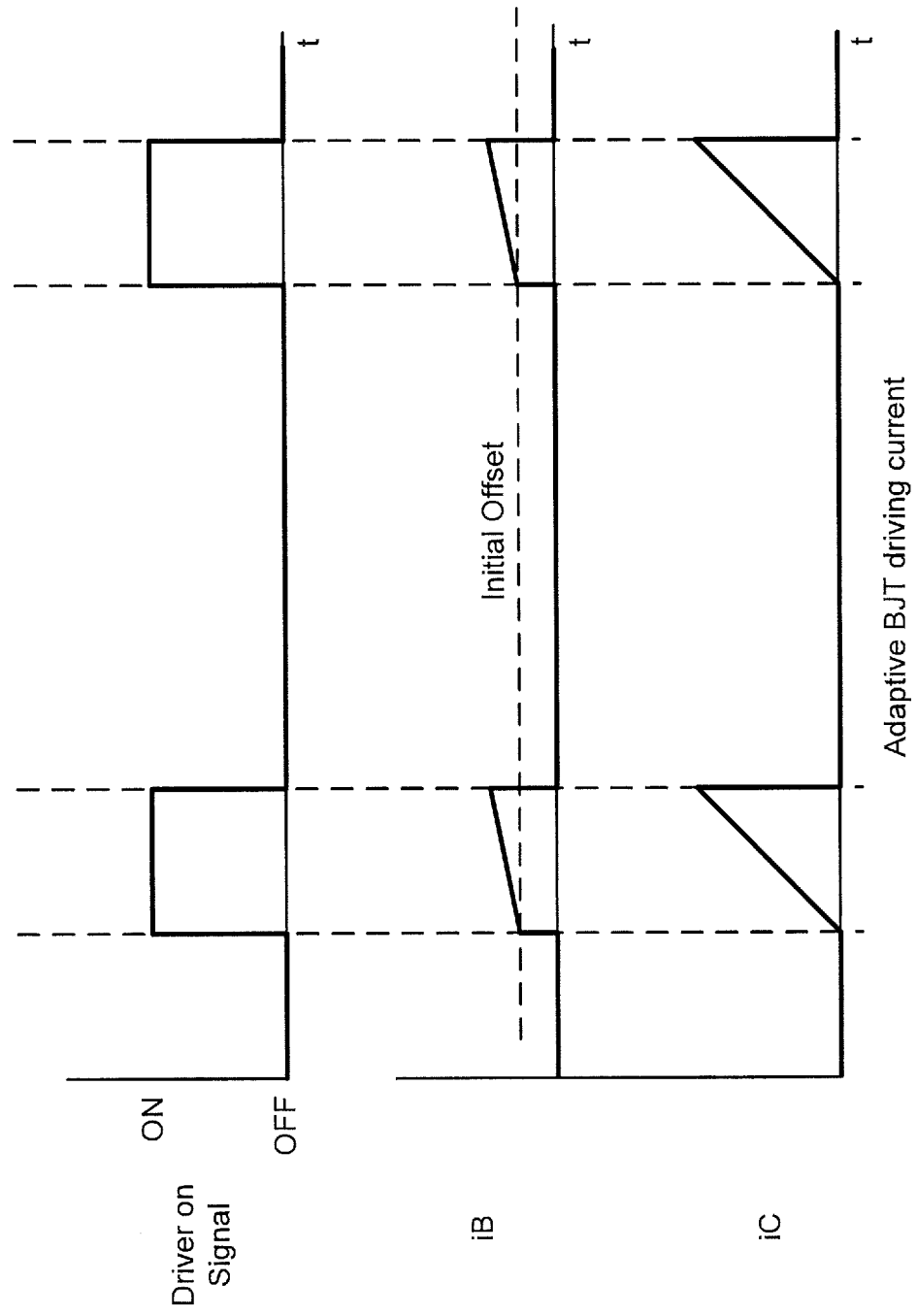
FIG. 3 illustrates the waveforms for the driver signal, base current, and collector current for a series of pulses in accordance with an embodiment of the disclosure.

To alleviate this thermal stress and save power, controller 205 is configured to adaptively drive the base current so that its amplitude varies across the pulse. In this fashion, power is saved because the base current has a smaller amplitude at the beginning of the pulse as opposed to using the peak base current value of the prior art. FIG. 3 illustrates some example waveforms for the adaptive base current generation. The driver on signal is as discussed with regard to FIG. 1. Controller 205 generates this signal to signal base driver 210 to generate the base current. Each collector current (iC) pulse ramps up from zero current to a peak collector current as also shown in FIG. 1. However, the base current (iB) pulses start from an initial offset value and linearly increase to a maximum value. The offset value assures that the BJT power switch is in saturation at the start of each pulse. To save power, this offset value is lower than the required base current to assure saturation at the peak collector current. Thus, the base current continues to increase across each pulse to reach a maximum base current value that assures saturation at the peak collector current value.

Note that the increase in base currents need not be linear but instead may be stepped, piecewise linear, or non-linear. Regardless of how the base current is increased, it starts from a relatively small offset value and reaches a maximum value that assures saturation at the desired peak current value as determined from, for example, primary-only feedback techniques such as those discussed above. Alternatively, the adaptive base current generation techniques discussed herein may be applied to switching power converters having conventional secondary feedback such as obtained through the use of opto-isolators. In addition, the adaptive base current generation techniques discussed herein may be applied to non-isolated switching power converters such as buck or boost switching power converters that include a BJT power switch.

To maintain an optimum level of base current that assures saturation of the BJT power switch without wasting power through excessive overdriving, controller 205 may be configured to control base current driver 210 such that the rate of increase of the base current across a pulse is proportional to the rate of change for the collector current across the pulse. In that regard, the rate of change for the collector current during each pulse equals a ratio of the input voltage $V_{IN}$ to the magnetizing inductance Lm for the transformer. Although the magnetizing inductance Lm is constant, the input voltage $V_{IN}$ will vary over time. For example, if a household user is running significant loads such as a household appliance or furnace, their AC line voltage will rise and fall accordingly. This change in their AC line voltage is rectified through the bridge rectifier BR1 of converter 200 to produce a corresponding change in the input voltage $V_{IN}$. However, this rate of change for the input voltage $V_{IN}$ is substantially stable over the relatively short time separating consecutive pulses of the BJT power switch. It is thus a relatively accurate assumption that the input voltage $V_{IN}$ for a given pulse will be substantially the same for the consecutive pulse. Since the ratio $V_{IN}/Lm$ equals the rate of change (diC/dt) for collector current, it is also a safe assumption that the rate of change for a current pulse can thus be assumed to be substantially the same as that for the preceding pulse. Given this rate of change for the collector current in a previous pulse, controller 205 may thus controller base current driver 210 so that a rate of change (diB/dt) for the base current iB in a subsequent pulse is proportional to the collector current rate of change for the previous pulse.

In a constant voltage mode pulse-by-pulse control embodiment for controller 205 such as discussed in the '732 patent, controller 205 calculates the peak collector current for each pulse to achieve the desired output voltage $V_{OUT}$ responsive to the feedback voltage $V_{sense}$. Controller 205 would then turn off the BJT in each switching cycle once the peak collector current is reached as monitored though the $I_{sense}$ feedback voltage. In a constant current mode pulse-by-pulse control embodiment for controller 205, the peak collector current is preset. In either mode (constant voltage or constant current), controller 205 will turn off the BJT power switch once the desired peak collector current has been achieved as monitored through the feedback voltage $I_{sense}$. In both modes, controller 205 thus has the necessary information to calculate the collector current rate of change diC/dt for a given pulse, which equals a ratio of the peak collector current to the on time ($t_{on}$) for the previous pulse to a good approximation. Controller 205 may then command base current driver 210 to drive the base current for the given pulse so as to achieve a rate of change iB/dt for the base current that is proportional to the rate of change diC/dt for the collector current. While configured in the constant current mode, the peak collector current $I_{peak}$ is preset by controller 205. So the only measurement needed from a previous pulse in such an embodiment is the on time $t_{on}$ for the pulse's duration. If controller 205 is configured into the constant voltage mode, the peak collector current does not vary from pulse to pulse so controller 205 needs only the on time $t_{on}$ from the previous pulse to determine the rate of change diB/dt for the base current in the current pulse. In the constant voltage mode, controller 205 measures both the peak collector current and the on time $t_{on}$ from the previous pulse to determine the rate of change diB/dt for the current pulse.

Regardless of the mode, controller 205 may then control base current driver 210 so that a rate of change (diB/dt) for the base current iB has a rate of change of $(1/\beta)*(di/dt)$. Note that saturation is assured because this rate of increase starts from the offset value that was selected to assure that the BJT is driven into saturation starting from the zero collector current. Moreover, a conservatively low value of β may be used to ensure the enforcement of saturation across the pulse. In an alternative embodiment, controller 205 could monitor in real time the increase of the collector current and adjust the base current accordingly. In such an embodiment, controller 205 would monitor the $I_{sense}$ voltage to determine the collector current rate of change diC/dt for the current pulse in real time. This real-time-calculated rate of change for the collector current would then be scaled such as with the inverse of the selected common emitter gain and the base current driven in real time accordingly.

Regardless of how controller 205 is to adaptively change the base current, base driver 210 drives the base current accordingly to ensure that the BJT power switch is maintained in saturation without wasting power on excessive overdrive and without the thermal stress of excessive overdrive. Note that the maximum base current value may be clamped to protect the base driver 210. In other words, the base current rate of increase would stop if the clamped value is reached for a given pulse. In addition, the adaptive base current driving process may be selectively disabled for certain load and input voltage conditions such as for light load conditions to ensure enough driving current is provided at such times. An example method of operation for a switching power converter will now be discussed.

Figure 4:
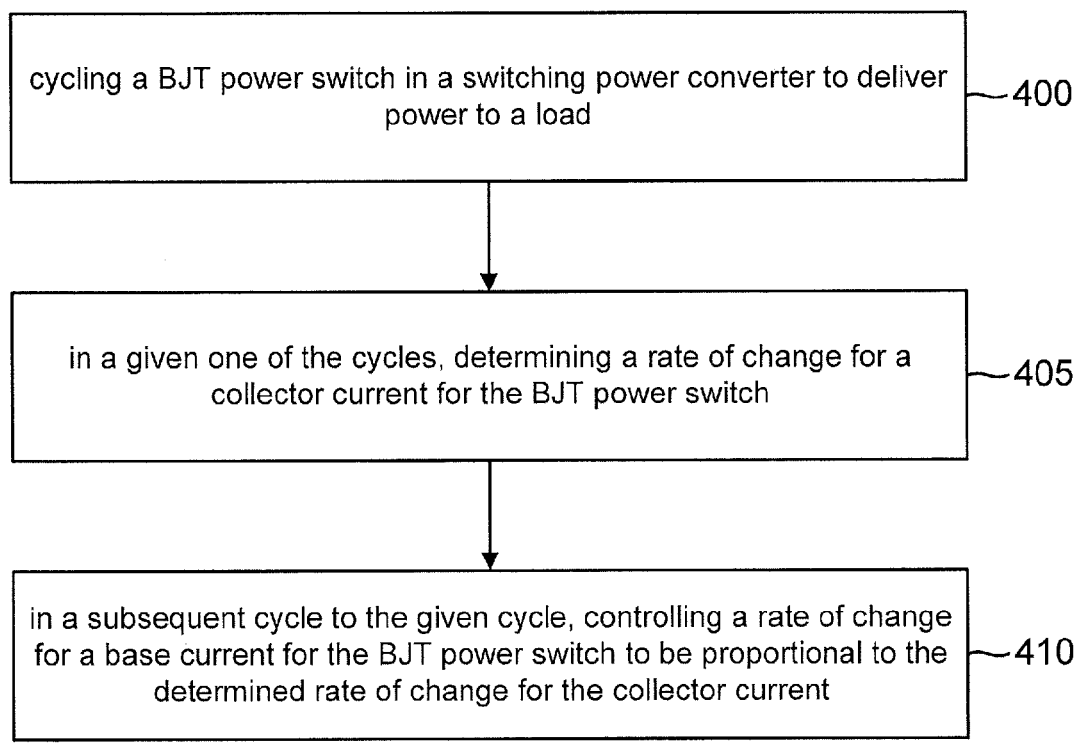
FIG. 4 is a flowchart for a method of controlling the power switch base current of a BJT power switch for a flyback converter in accordance with an embodiment of the disclosure.

FIG. 4 is a flowchart for an example method of operation for a switching power converter including a BJT power switch. An act 400 comprises cycling a BJT power switch in a switching power converter to deliver power to a load. The cycling of the BJT power switch in converter 200 is an example of act 400. In addition, the method includes an act 405 for a given one of the cycles for the BJT power switch. In particular, act 405 comprises determining a rate of change for a collector current for the BJT power switch. Using a ratio of the peak current for the given cycle and the on time ton to obtain the collector current rate of change is an example of act 400. Finally, the method includes an act 410 for a switching cycle that is subsequent to the given cycle of act 405. In particular, act 410 comprises controlling a rate of change for a base current for the BJT power switch to be proportional to the determined rate of change for the collector current. Referring again to FIG. 2, the control of base current driver 210 by controller 205 so that the base current has a rate of change proportional to the collector current rate of change in a previous pulse is an example of act 405.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter, comprising:
a bipolar junction transistor (BJT) power switch coupled to an inductor;

a base current driver configured to drive a base current into a base of the BJT power switch; and a controller configured to control the base driver so that the BJT power switch cycles on and off according to the driving of the base current, wherein the base current for each current cycle in at least some of the BJT power switch cycles starts from a beginning value and is increased to a maximum value at a rate of change for the base current that is proportional to a rate of change for a collector current for the BJT power switch in a previous cycle to the current cycle.

2. The switching power converter of claim 1, wherein the switching power converter is a flyback converter, and wherein the inductor is a primary winding of a transformer for the flyback converter.

3. The switching power converter of claim 2, wherein the controller is configured to determine a peak collector current and an on time for the BJT power switch in the previous cycle, and wherein the controller is further configured to determine the rate of change for the previous cycle using a ratio of the peak collector current to the on time.

4. The switching power converter of claim 1, wherein the controller is configured to control the base driver so that the rate of change for the base current is proportional to $(1/\beta)$ times the collector current rate of change, where $\beta$ is a common emitter gain for the BJT power switch.

5. The switching power converter of claim 4, wherein the common emitter gain is a forced common emitter gain.

6. The switching power converter of claim 1, wherein the controller is configured to control the base driver so that the beginning value for the base current is an offset value from zero.

7. The switching power converter of claim 1, wherein the controller is further configured to limit the rate of change for the base current when a maximum base current level is reached.

8. The switching power converter of claim 3, wherein the controller is configured to maintain a constant peak current in each cycle of the BJT power switch.

9. The switching power converter of claim 3, wherein the controller is configured to maintain a constant output voltage across a load.

10. A method, comprising:
cycling a bipolar junction transistor (BJT) power switch in a switching power converter to deliver power to a load;
in a given one of the cycles, determining a rate of change for a collector current for the BJT power switch; and
in a subsequent cycle to the given cycle, controlling a rate of change for a base current for the BJT power switch to be proportional to the determined rate of change for the collector current.

11. The method of claim 10, wherein determining the rate of change for the collector current comprises determining a ratio of a peak collector current for the BJT power switch to an on time for the BJT power switch.

12. The method of claim 10, wherein controlling the rate of change of change for the base current comprises controlling the rate of change for the base current to equal $(1/\beta)$ times the determined collector current rate of change for the given cycle.

13. The method of claim 10, wherein each cycle of the BJT power switch comprises switching on the BJT power switch and then switching off the BJT power switch when the collector current has reached a desired peak collector current, each cycle having an on time equaling a delay between the switching on of the BJT power switch and the switching off of the BJT power switch.

14. The method of claim 13, wherein controlling the rate of change for the base current comprises determining a ratio of the peak collector current and the on time for the given cycle and controlling the rate of change for the base current to be proportional to the ratio.

15. The method of claim 13, wherein the peak collector current is a constant peak collector current across the cycles.

16. The method of claim 13, wherein the peak collector current varies from cycle to cycle.

17. The method of claim 10, wherein controlling the rate of change for the base current further comprises inhibiting further changes in the base current in the subsequent cycle when the base current becomes greater than a maximum allowed base current threshold value.

18. A flyback converter, comprising:
a bipolar junction transistor (BJT) power switch coupled to primary winding of a transformer;
a base current driver configured to drive a base current into a base of the BJT power switch; and
a controller configured to control the base driver so that the BJT power switch cycles on and off according to the driving of the base current, wherein the base current for each current cycle in at least some of the BJT power switch cycles starts from a beginning value and is increased to a maximum value at a rate of change for the base current that is proportional to a rate of change for a collector current for the BJT power in the current cycle.

19. The flyback converter of claim 18, wherein the controller is configured to control the base driver so that the rate of change for the base current is proportional to $(1/\beta)$ times the collector current rate of change, where $\beta$ is a common emitter gain for the BJT power switch.

20. The flyback converter of claim 19, wherein the common emitter gain is a forced common emitter gain.

* * * * *